J. H. LILLY.
Straw Cutter.
No. 30,414.
Patented Oct. 16, 1860.
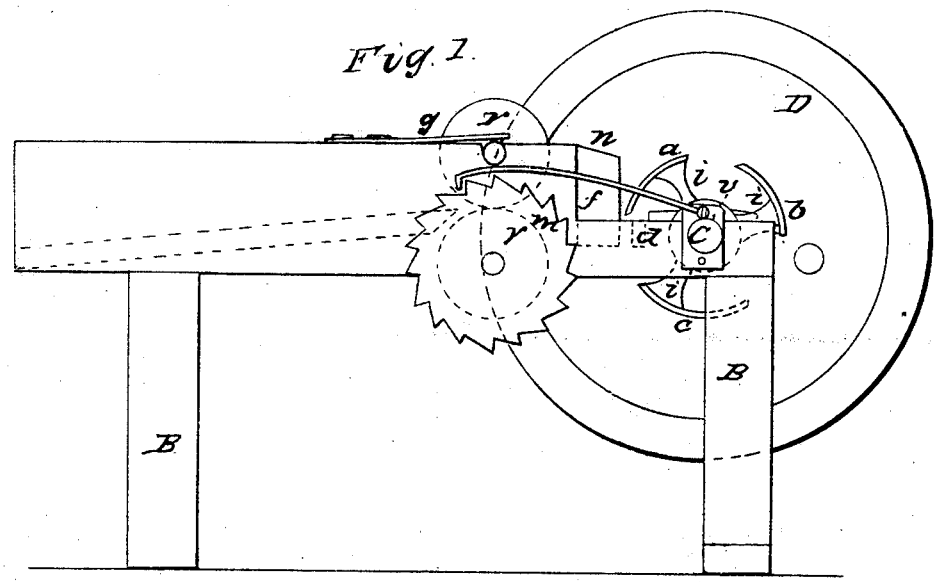
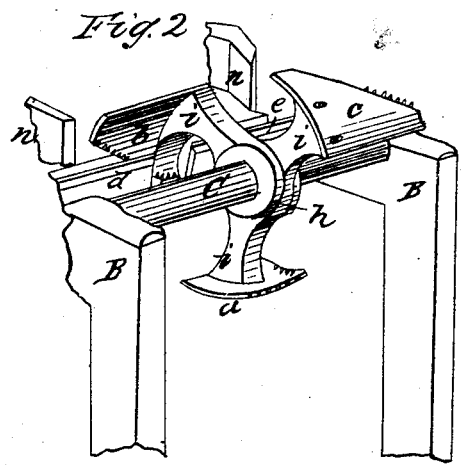
Witnesses
J. O. Coombs
R. S. Spencer
Inventor
John H. Lilly
per Munn & Co.
Attorneys

UNITED STATES PATENT OFFICE.

JOHN H. LILLY, OF BARDSTOWN, KENTUCKY.

STRAW-CUTTER.

Specification of Letters Patent No. 30,414, dated October 16, 1860.

*To all whom it may concern:*

Be it known that I, JOHN H. LILLY, of Bardstown, in the county of Nelson and State of Kentucky, have invented a new and useful Improvement in Straw-Cutters; and I do hereby declare that the following is a full, clear, and exact description of the same, reference being had to the accompanying drawings, forming a part of this specification, in which—

Figure 1 is a side elevation of my invention. Fig. 2 is a perspective of a part of the machine, and showing the knives $a$, $b$, and $c$; the cutter-head $h$, and the steel bars or rests $d$, and $e$.

Similar letters of reference in both figures indicate like parts.

This invention consists in the arrangement of three sickle-edged knives in straw cutters (one of them being V-shaped and the other two triangular) with rests or supporters for the projecting straw while the said knives are cutting it off. The cutting edge of the knives, is so arranged as to have a shearing stroke. The triangular shaped knives, cut, one from the center of the mouth of the box, to one side, and the other one, from the center to the other side, and the V-shaped knife cuts both ways from the center, but only about half as far as the other two. By means of the supports or rests for the end of the straw which prevent it from lopping down, it must be cut off whether the knives run close to the mouth or end of the box or not which is not the case with machines in which they are not used, the knives in such machines requiring a very delicate adjustment, and also a very sharp edge, neither of which is demanded in this arrangement, the sickle edges, which require no sharpening answering every purpose.

To enable those skilled in the art to make and use my invention I will proceed to describe its construction and operation, having reference to the drawings.

The several letters B, represent the frame work. The knives $b$, and $c$, are made triangular shaped, and the acute points are cut off at right angles with their base and perpendicular sides. Their base lines are a little longer than their perpendiculars. The knife $a$ is V shaped, and they are all made of plate steel, with sickle edges, and are curved as seen in Fig. 1, each forming a segment of the same circle, they are attached to the wings $i$, of the cutter head $h$, by screws having counter sunk heads.

The right-angle corner of the knife $b$, is attached to the cutter head and its cutting edge reaches to the left. The knife $c$, is similarly attached but reaches to the right. The knife $a$, is attached in the center of its base, and its edges reach both ways.

The bars, or rests, $d$, and $e$, are made of steel and beveled on their upper edge; they are fixed to the frame B,—$d$, on one side and $e$, on the other and project toward each other, leaving only sufficient room between their ends for the arms $i$, to pass; and they are so arranged as to allow the knives $a$, $b$, and $c$, to pass freely between them and the end of the box $n$.

The fly wheel D and the cutter head $h$, are attached to the shaft $o$. The feed rollers $r$, are turned by means of the bent rod $f$, which is hinged to the shaft $c$, by the crank $v$.

The ratchet or feed wheel $m$, is attached to the end of the lower roller and as the shaft $c$, revolves, the hook at the end of the rod $f$, catches a tooth of the wheel $m$, and moves it forward.

The upper roller $r$, is pressed upon the straw by a strap spring $g$ at each end.

What I claim as new and desire to secure by Letters Patent, is—

The arrangement of the three sickle-edged knives $a$, $b$, and $c$, with the steel bars $d$, and $e$, all the parts being constructed and operating in the manner herein set forth.

JOHN H. LILLY.

Witnesses:
WILLIAM JOHNSON,
LUIS DRAGOV.